July 12, 1960
W. W. PETTIS
2,944,407
REFRIGERATION AND HEATING APPARATUS OF THE ABSORPTION
TYPE FOR USE ON INTERNAL COMBUSTION
ENGINES INCLUDING A MUFFLER
Filed Feb. 27, 1958
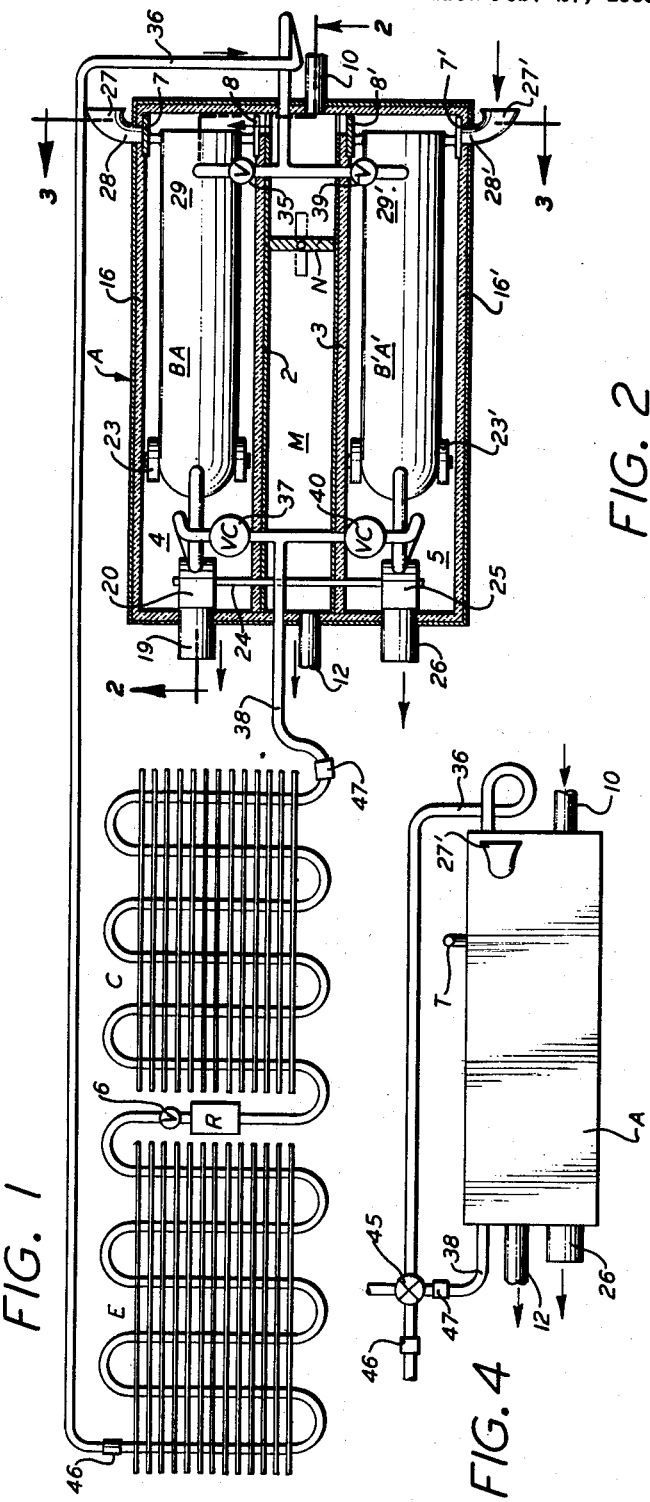
INVENTOR.
Wendell W. Pettis
BY Scott L. Norvell
ATTORNEY United States Patent Office
2,944,407
Patented July 12, 1960

2,944,407
REFRIGERATION AND HEATING APPARATUS OF THE ABSORPTION TYPE FOR USE ON INTERNAL COMBUSTION ENGINES INCLUDING A MUFFLER

Wendell W. Pettis, 1715 E. Cherry-Lynn Drive, Phoenix, Ariz.

Filed Feb. 27, 1958, Ser. No. 718,055

7 Claims. (Cl. 62—144)

This invention concerns apparatus for utilizing the waste heat from internal combustion engines to automatically provide refrigeration.

One of the objects of the invention is to provide mechanism for transferring heat from the exhaust gases of internal combustion engines to each of a pair of refrigerant absorbers alternately, while the other absorber of said pair is cooled and filled with refrigerant;

Another object is to provide apparatus for automatic continuous operation of an absorption refrigeration system wherein waste heat from the exhaust of an internal combustion engine is transmitted to the absorbing elements of the refrigeration system and automatically switched from one element which has discharged substantially all refrigerant to an element which is saturated and is ready to discharge refrigerant;

Still another object is to provide an apparatus for producing refrigeration from waste heat of an internal combustion engine, or any othere source of heat, which will automatically drive a refrigerant liquid from one of a pair of refrigerant absorption elements through condensing and evaporating apparatus while the other absorbing element is cooled and is absorbing refrigerant from said evaporating apparatus and therafter, when the absorbing substance in said second absorption element is fully saturated with the refrigerant, will transfer the absorption to the first absorbing element and cause it to absorb refrigerant from the evaporator of said refrigeration apparatus;

Still another object of the invention is to provide controls and valves for the automatic operation of such apparatus.

A further object of the revision is to provide a valving mechanism which will cause the condenser to act as an evaporator and the evaporator to act as a condenser whereby, without moving these elements, the device as a whole can be used as a heater;

Another object is to provide a device as above described, wherein the element used to receive exhaust gas from an internal combustion engine, for the purposes of heating other elements of the device, is also a muffler for said internal combustion engine.

I accomplish the above objects by means of the apparatus shown in the accompanying drawings wherein—

Figure 1 is a plan view in semi-diagrammatic form, of apparatus for converting heat from exhaust gases into refrigeration;

Figure 2 is a vertical section taken substantially on line 2—2 of Figure 1 showing the interior of a portion of the apparatus container;

Figure 3 is a vertical section taken substantially on traverse line 3—3 of Figure 1;

Figure 4 is a side elevational view of the case containing the apparatus shown in Figure 2.

Similar numerals refer to similar parts in the several views.

The apparatus here concerned consists of the following principal parts:

A indicates an insulated container box which is divided into three compartments, M, 4 and 5 by partitions 2 and 3. Within this box the central compartment M operates as a muffler when the exhaust gases are not diverted to compartments 4 or 5. Flow through compartment M can be blocked by rotary valve N, manually operated by handle. The compartment 4 contains a boiler absorber B—A. Compartment 5 contains boiler absorber B'—A'.

Exhaust gases entering compartment M and blocked by valve N are diverted, during the operation of the apparatus, through compartments 4 and 5 alternately, as necessary to carry out the cycle of operations, by slide valves 7 and 8 and 7' and 8' operating over ports in the side walls 16 and 16' of case A and partitions 2 and 3. Each of the boiler absorbers, B—A and B'A', contains a liquid refrigerant absorbent substance, such as, for example refined petroleum, or ethylglycol. The refrigerant gas which is absorbed, is in this case, methyl chloride, or methylene chloride, or propane, or ethylene chloride, or ethyl chloride.

In the course of manufacture, each of the boilers is about one-half filled with the absorbent liquid and then one of the boilers is exhausted so that most of the contained air is withdrawn, at the same time methyl chloride is introduced into the boiler absorber until the absorbent is saturated.

The operation, in general, includes the heating of boiler absorbers to force the refrigerant gas dissolved therein into the condenser C from which it expands through the expansion valve 6 into the evaporator E. The gas is returned from the evaporator to the second boiler absorber which is cooled.

In carrying out this operation it is to be noted that the exhaust gases enter chambers 4 or 5 through a pipe 10 and in general exit through pipe 12 at the opposite end. In this case chamber M merely acts as a muffler, and there is no refrigeration produced.

Gate valves 7 and 8, and 7' and 8' are provided at the entrance end of compartment M and also compartments 4 and 5, to open and close vents 9 and 9', and 9a and 9'a, so that the exhaust gases can be made to traverse compartments 4 and 5 alternately. As shown, compartment 4 is receiving exhaust gases from pipe 10 which enters the entrance end of compartment M (valve N being closed) and then traverse the entire compartment 4 and travel over and heat boiler absorber B—A therein. At the end opposite the entrance these gases leave the compartment through tube 19 and drive a small combination turbine-blower fan 20. The rotor 22 of this fan is on a shaft 24 which extends transversely of the case A and carries a similar combination turbine-blower 25 which is connected to pipe 26 in compartment 5. The turbine-blower fan 20, driven by the exhaust gases in compartment 4, drives the rotor of the turbine-blower 25 in compartment 5 so as to cause it to draw gases through the said other compartment 5.

Each compartment 4 and 5 has an air scoop 27 and inlet pipe 28 at the end where the exhaust gases enter, which will induct cool air. This may receive air either by the forward motion of a vehicle, if the device is used on a vehicle, or on any other means adapted to force fresh air into the compartment.

Gate valves 7 and 8 and 7' and 8' open compartments 4 and 5 alternately to the entrance of exhaust gases from compartment M and the induction of fresh air from the scoops 27 and 27' by the hinging motion of the free end 29 of each of the boiler absorbers. These absorbers are supported at the outer ends on brackets 23 and by springs 30 at the other free end 29. This structure permits the outer end to hinge on the pivot supports 23 and move the free end 29 up and down according to the weight of the refrigerant gas contained in the absorbent liquid.

As shown, the boiler absorber B—A contains little refrigerant and has hinged to an upper position, shown particularly in Figure 3. Its valve 7 has closed the passageway which admits cold air through pipe 28 into compartment 4, and the valve 8 has opened compartment 4 to the fore portion of compartment M. This admits heat and heats B—A. The gases admitted, leave through pipe 19 and drive fan 20 as a turbine.

Pressure built up in boiler absorber B—A closes check valve 35 which is connected to the return pipe 36 from evaporator E, and opens check valve 37 which connects to the refrigerant outlet pipe 38 which leads to condenser C.

Meanwhile the exhaust gate valve 8' opening into compartment 5 is closed to the exhaust gases from compartment M, and boiler absorber B'—A', is being filled with the refrigerant gas from pipe 36, which flows from the evaporator E through check valve 39.

To cause absorption boiler absorber B'—A' is cooled by air inducted through air scoop 27' and pipe 28', and rotor 25 operating as a fan blows air out through pipe 26. Hot gases from B—A cannot enter B'—A' because of check valve 40, and as the petroleum oil in B'—A' absorbs methyl chloride its free end 29' becomes heavier, sinks toward the position shown in Figure 3, and spring 30' is compressed.

When the cycle illustrated in the figures is completed the conditions are reversed and the boiler absorber A'—B' acts like B—A, as above described. This takes place when B'—A' will absorb no more gas and B—A will furnish no more gas under sufficient pressure. Under these conditions there is a momentary lag of operation. Refrigerant stored in tank R furnishes gas for a short time. As soon as the pressure drops in B—A there is not enough back pressure on check valve 35 to hold it shut against the pressure in pipe 36. Therefore pressure through this pipe from E enters B—A where it is absorbed, gains weight, descends at end 29 and closes port or vent 9a. This cuts off the supply of hot exhaust gases from M. At the same time cool air enters scoop 27 and tube 28 and cool air enters compartment 4. Circulation is maintained by rotor 20 acting as a blower.

Meanwhile drop of pressure in C permits gas to flow out of B'—A' through check valve 40. Its weight lessens and spring 30' pushes upward opening port or vent 9'a to M. This starts the second phase of the operation cycle.

Operation may be terminated or controlled by opening valve N by manipulating handle T.

In certain installations, such as automotive vehicles, it is sometimes advisable to reverse the function of C and E. The evaporator may then be used as a heater without other changes in structure. This may readily be accomplished by installing a double or four port valve 45 between pipes 36 and 38 as shown in Figure 4. By connecting the entrance 46 of E to pipe 38 instead of 36, and the entrance 47 to C to pipe 36 instead of 38, the flow through E and C will be reversed and E will be the condenser and give off heat. This will warm the portion of the vehicle in which it is installed.

Whereas, I have specified that methyl chloride is the refrigerant gas, and refined petroleum oil is the absorbent liquid in the boiler absorbers, it is to be understood that many other substances may be used for the same purpose. For example: ethyl chloride and mineral oil, propane and mineral oil, or even ammonia and water.

The apparatus, here disclosed, while primarily intended for internal combustion engines or automotive vehicles having exhaust heat available, may also be used on stationary engines or wherever heat is available or may be generated.

I claim:

1. In refrigeration apparatus of the absorption type having an evaporator and a condenser connected to said evaporator through an expansion valve, and means operated by heat for forcing methyl chloride, as a refrigerant gas, under pressure into said condenser and absorbing said gas from said evaporator after expansion in said evaporator, consisting of a first elongated boiler absorber hingedly supported at one end and resiliently supported at the other end, and approximately half filled with refined liquid petroleum, as an absorber, connected by an inlet pipe and through an inwardly opening check valve to said evaporator, and connected by an outlet pipe through an outwardly opening check valve to said condenser, and a second boiler absorber hingedly supported at one end and resiliently supported at the other end, and approximately half filled with refined liquid petroleum, as an absorber, connected by an inlet pipe and through an inwardly opening check valve to said evaporator, and connected by an outlet pipe through an outwardly opening check valve to said condenser; said condenser, evaporator, and the spaces in said boiler absorbers being charged with methyl chloride, as a refrigerant gas; and means for alternately heating and cooling said boiler absorbers consisting of a container box divided into three parallel compartments by two parallel longitudinal partitions; the central compartment being connected at one end to a source of heated gas, and said boiler absorbers being disposed in the two side compartments and supported hingewise at one end and on a spring at the opposite end, valves on the spring supported ends of said boiler absorbers adapted to admit heated air from said central compartment when the free end of a boiler absorber is lowered and to close said side compartment to said heated air when said boiler absorber is raised, air scoops on the outside of said side compartments opening into said compartments, and valves on the free ends of said boiler absorbers operated by the up and down motion of said free ends, opening said side compartments to said air scoops when the free end of a boiler absorber is raised, and inter-connected turbo-blowers in the ends of each of said side compartments opposite said air scoops, each acting as a turbo motor when hot gases are let into said compartment to discharge said hot gases therefrom, and driving the other turbo-blower as a blower to discharge air let into said compartment by said air scoops.

2. The apparatus described in claim 1, together with a fourway crossover valve connecting the outlet of the evaporator and the inlet of the condenser to the inlet pipes and outlet pipes of the boiler absorber so that refrigerant gas, discharged from either boiler absorber may be switched from the condenser inlet to the evaporator outlet, and the inlet pipes of said boiler absorbers switched from the evaporator outlet to the condenser inlet.

3. Apparatus as described in claim 1, wherein methylene chloride and mineral oil are the refrigerants and absorbent, respectively.

4. Apparatus as described in claim 1 wherein propane is the refrigerant and mineral oil is the absorbent liquid.

5. Apparatus as described in claim 1 wherein ethylene chloride is the refrigerant and mineral oil is the absorbent liquid.

6. Apparatus as described in claim 1 wherein ethyl chloride is the refrigerant and mineral oil is the absorbent liquid.

7. In refrigeration apparatus of the absorption type having an evaporator and a condenser connected to said evaporator through an expansion valve, and means operated by heat for forcing a refrigerant gas, under pressure into said condenser and absorbing said gas from said evaporator after expansion in said evaporator, consisting of a first elongated boiler absorber hingedly supported at one end and resiliently supported at the other end, and approximately half filled with a liquid absorber, connected by an inlet pipe and through an inwardly opening check valve to said evaporator, and connected by an outlet pipe through an outwardly opening check valve to said condenser, and a second boiler absorber hingedly supported at one end and resiliently supported at the other end, and approximately half filled with a liquid absorber, connected by an inlet pipe and through an inwardly opening check valve to said evaporator, and connected by an outlet pipe through an outwardly opening check valve to said condenser; said condenser, evaporator, and the spaces in said boiler absorbers being charged with said refrigerant gas; and means for alternately heating and cooling said boiler absorbers consisting of a container box divided into three parallel compartments by two parallel longitudinal partitions; the central compartment being connected at one end to a source of heated gas, and said boiler absorbers being disposed in the two side compartments and supported hingewise at one end and on a spring at the opposite end, valves on the spring supported ends of said boiler absorbers adapted to admit heated air from said central compartment when the free end of a boiler absorber is lowered and to close said side compartment to said heated air when said boiler absorber is raised, air scoops on the outside of said side compartments opening into said compartments, and valves on the free ends of said boiler absorbers operated by the up and down motion of said free ends, opening said side compartments to said air scoops when the free end of a boiler absorber is raised, and inter-connected turbo-blowers in the ends of each of said side compartments opposite said air scoops, each acting as a turbo motor when hot gases are let into said compartment to discharge said hot gases therefrom, and driving the other turbo-blower as a blower to discharge air let into said compartment by said air scoops.

References Cited in the file of this patent

UNITED STATES PATENTS

| | | |
|---|---|---|
| 2,039,588 | Forsberg | May 5, 1936 |
| 2,093,552 | Elfving et al. | Sept. 21, 1937 |
| 2,287,172 | Harrison et al. | June 23, 1942 |
| 2,455,401 | Brause | Dec. 7, 1948 |